(12) United States Patent
Lin et al.

(10) Patent No.: US 11,675,094 B2
(45) Date of Patent: Jun. 13, 2023

(54) X-RAY DEVICE

(71) Applicant: InnoCare Optoelectronics Corporation, Tainan (TW)

(72) Inventors: Wen Chien Lin, Tainan (TW); Chih-Hao Wu, Tainan (TW)

(73) Assignee: InnoCare Optoelectronics Corporation, Tainan (TW)

( * ) Notice: Subject to any disclaimer, the term of this patent is extended or adjusted under 35 U.S.C. 154(b) by 0 days.

(21) Appl. No.: 17/400,116

(22) Filed: Aug. 12, 2021

(65) Prior Publication Data

US 2022/0082712 A1 Mar. 17, 2022

(30) Foreign Application Priority Data

Sep. 11, 2020 (CN) .......................... 202010952242.6

(51) Int. Cl.
*G01T 1/208* (2006.01)
*G01T 1/20* (2006.01)
*G01N 23/04* (2018.01)

(52) U.S. Cl.
CPC ............. *G01T 1/208* (2013.01); *G01N 23/04* (2013.01); *G01T 1/2002* (2013.01); *G01T 1/20188* (2020.05)

(58) Field of Classification Search
CPC ... G01T 1/208; G01T 1/2002; G01T 1/20188; G01T 1/20; G01N 23/04; H05G 1/085; H05G 1/30
See application file for complete search history.

(56) References Cited

U.S. PATENT DOCUMENTS

| | | | |
|---|---|---|---|
| 2015/0071401 A1* | 3/2015 | Lacey | G01N 23/046 378/19 |
| 2017/0294247 A1* | 10/2017 | MacLaughlin | G01T 1/2002 |
| 2019/0137635 A1* | 5/2019 | Henderson | H01L 27/14658 |
| 2019/0319049 A1 | 10/2019 | Bert et al. | |
| 2019/0353805 A1 | 11/2019 | Konkle et al. | |
| 2021/0003723 A1* | 1/2021 | Iwakiri | G01T 1/20188 |

FOREIGN PATENT DOCUMENTS

| | | |
|---|---|---|
| CN | 109887940 | 6/2019 |
| EP | 3228251 | 10/2017 |
| WO | 2018129148 | 7/2018 |
| WO | 2019104657 | 6/2019 |
| WO | 2019187923 | 10/2019 |

OTHER PUBLICATIONS

"Search Report of Europe Counterpart Application", dated Feb. 1, 2022, p. 1-p. 9.

* cited by examiner

*Primary Examiner* — Kiho Kim
(74) *Attorney, Agent, or Firm* — JCIPRNET

(57) ABSTRACT

An X-ray device is provided, which includes a flexible substrate, a driver integrated circuit, and a scintillator layer. The flexible substrate includes an array portion and an extension portion. The driver integrated circuit is disposed on the flexible substrate. The scintillator layer is disposed on the flexible substrate.

19 Claims, 4 Drawing Sheets

X-RAY DEVICE

CROSS-REFERENCE TO RELATED APPLICATION

This application claims the priority benefit of Chinese application serial no. 202010952242.6, filed on Sep. 11, 2020. The entirety of the above-mentioned patent application is hereby incorporated by reference herein and made a part of this specification.

BACKGROUND

Technical Field

The disclosure relates to an X-ray device.

Description of Related Art

An X-ray device converts an X-ray into visible light through a scintillator. Then, a sensing panel in the X-ray device senses the visible light and further converts the same into an image corresponding to the light intensity distribution of the visible light. Generally speaking, an X-ray device may include a scintillator, a sensing panel, a flexible board, and a circuit board, among other components. These components are usually bonded together through bonding processes. However, being numerous and complicated, the bonding processes tend to cause difficulty in achieving requirements such as high yield rate, low cost, or light weight of the X-ray device.

SUMMARY

The disclosure provides an X-ray device, which helps to improve yield rate, reduce cost, or achieve light weight.

According to the embodiments of the disclosure, the X-ray device includes a flexible substrate, a driver integrated circuit, and a scintillator layer. The flexible substrate includes an array portion and an extension portion. The driver integrated circuit is disposed on the flexible substrate. The scintillator layer is disposed on the flexible substrate.

Based on the foregoing, in the embodiments of the disclosure, the driver integrated circuit and the scintillator layer are disposed on the flexible substrate. That is to say, the flexible substrate may integrate components such as the sensing panel, the flexible board, and the circuit boards. Therefore, the complicated bonding process can be simplified, which helps to improve the yield rate, reduce the cost, or achieve light weight.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
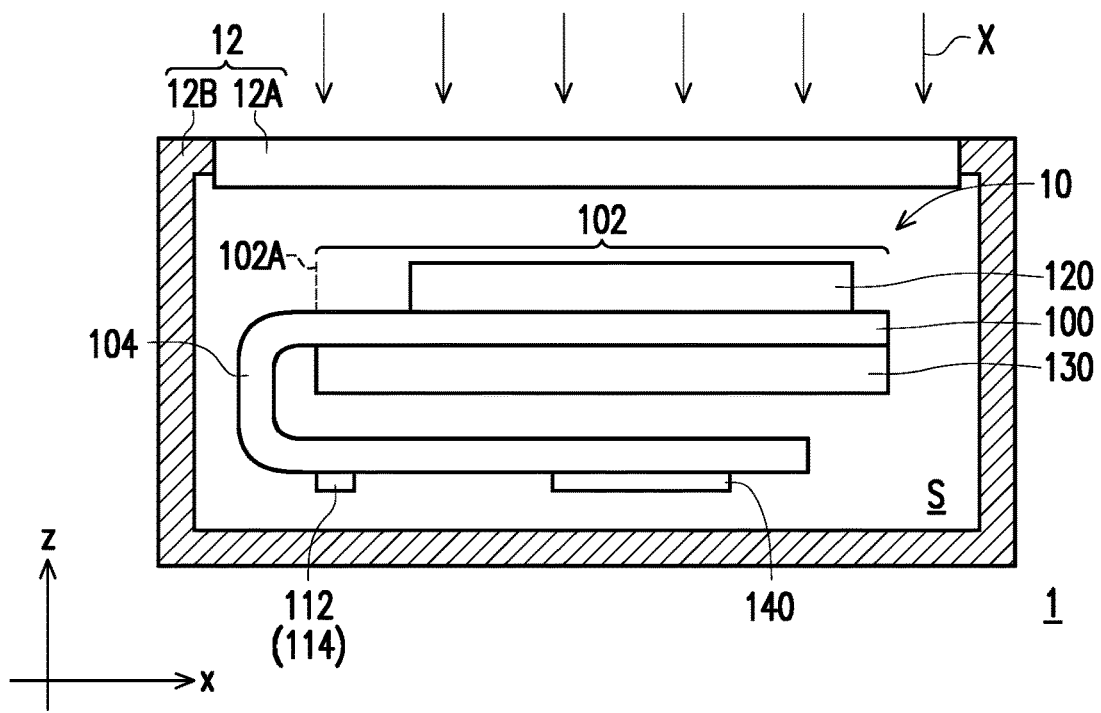
FIG. 1 is a schematic cross-sectional view of an X-ray device according to an embodiment according to the disclosure.

The disclosure may be understood with reference to the following detailed description and the accompanying drawings. It should be noted that, for ease of understanding by readers and conciseness of the drawings, a plurality of drawings in the disclosure merely show a part of an electronic device, and specific elements in the drawings are not drawn to scale. Besides, the number and dimension of each element in the drawings merely serve as an exemplar instead of limiting the scope of the disclosure. For example, a relative dimension, thickness, and position of each film layer, region, and/or structure may be reduced or enlarged for the sake of clarity.

Some terms are used to refer to specific elements throughout the whole specification and the appended claims in the disclosure. A person skilled in the art should understand that an electronic device manufacturer may use different names to refer to the same elements. This specification is not intended to distinguish elements that have the same functions but different names. In the specification and the claims hereinafter, terms such as "have", "include", and "comprise" are open-ended terms, and should be interpreted as "including, but not limited to".

The directional terms mentioned herein, like "above", "below", "front", "back", "left", "right", and the like, refer only to the directions in the accompanying drawings. Therefore, the directional terms are used for explaining instead of limiting the disclosure. It should be understood that when an element or film layer is referred to as being disposed "on", or "connected to" another element or film layer, the element or film layer may be directly on or connected to said another element or film layer, or intervening elements or film layers may also be present (non-direct circumstances). In contrast, when an element or film layer is referred to as being "directly on" or "directly connected to" another element, no intervening elements or film layers are present. Besides, when an element or film layer is referred to as "overlapping" another element, the element or film layer at least partially overlaps said another element or film layer.

The terms "about", "approximately", "substantially" or "substantially" mentioned herein typically represents that a value is in a range within 10% of a given value, or a range within 5%, 3%, 2%, 1%, or 0.5% of a given value. Besides, the terms "the given range is from the first value to the second value" and "the given range falls within the range of the first value to the second value" mean that the given range includes the first value, the second value and other values in between.

In some embodiments in the disclosure, terms such as "connect", "interconnect", etc. regarding bonding and connection, unless specifically defined, can mean that two structures are in direct contact, or that two structures are not in direct contact, and there are other structures provided between these two structures. The terms of bonding and connection may also include the case where both structures are movable or both structures are fixed. In addition, the terms "electrical connect" and "couple" include any direct and indirect electrical connection means.

In the following embodiments, identical or similar reference numerals will be adopted for identical or similar elements, and repeated description thereof will be omitted. Besides, the features in the different exemplary embodiments may be used in combination with each other without departing from or conflicting with the spirit of the disclosure, and simple equivalent variations and modifications made in accordance with this specification or the claims are still within the scope of the disclosure. That is, the following embodiments may replace, recombine, and mix technical features in several different embodiments to achieve other embodiments without departing the spirit of the disclosure. Moreover, "first", "second", and similar terms mentioned in the specification or the claims are merely used to name discrete elements or to differentiate among different embodiments or ranges. Therefore, the terms should not be regarded as limiting an upper limit or a lower limit of the quantity of the elements and should not be used to limit the manufacturing sequence or arrangement sequence of elements.

Figure 2:
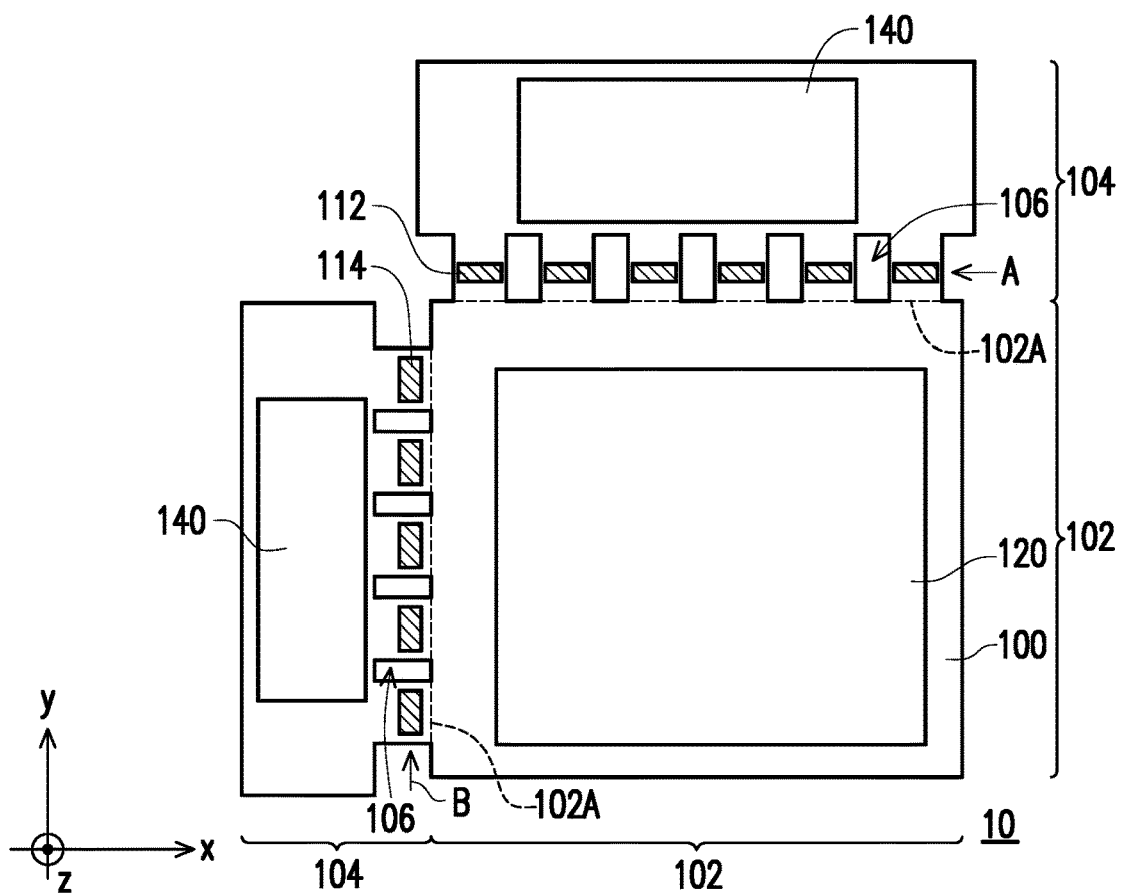
FIG. 2 is a schematic top view of the sensing structure in FIG. 1 in a flattened state.

FIG. 1 is a schematic cross-sectional view of an X-ray device according to an embodiment according to the disclosure. FIG. 2 is a schematic top view of the sensing structure in FIG. 1 in a flattened state. A top view direction referred to in the disclosure may be, for example, a z direction.

With reference to FIG. 1 and FIG. 2, an X-ray device 1 may include a sensing structure 10. The sensing structure 10 may include a flexible substrate 100, a scintillator layer 120, a supporting plate 130, a driver integrated circuit 112, and a driver integrated circuit 114. The flexible substrate 100 may include an array portion 102 and an extension portion 104. A boundary 102A may be a line at the junction between the array portion 102 and the extension portion 104. The driver integrated circuit 112 and/or the driver integrated circuit 114 may be disposed on the flexible substrate 100. The scintillator layer 120 may be disposed on the flexible substrate 100.

In some embodiments, the array portion 102 of the flexible substrate 100 may include a plurality of sensing units (not shown) and a plurality of circuits (not shown) electrically connected to the sensing units. In some embodiments, the sensing units may be arranged in an array to generate images. At least one sensing unit may include one or more switching elements and one or more sensing elements electrically connected to the one or more switching elements. The switching element, for example, may include, but is not limited to, a thin film transistor, such as a top gate, bottom gate, or dual gate or double gate thin film transistor that includes amorphous silicon, low temperature polysilicon (LTPS) or metal oxide. In some embodiments, different thin film transistors may include the above different semiconductor materials. The sensing element is adapted to sense visible light and generate an electronic signal corresponding to light intensity of the visible light. For example, the sensing element may include a photodiode. Nonetheless, the arrangement of the sensing units, the number of switching elements included in each sensing unit, the number of sensing elements included in each sensing unit, the kind of switching element, or the kind of photosensitive element may be changed depending on requirements, and is not limited thereto. The circuit electrically connected to the sensing unit may include a data line (not shown) and a gate line (not shown). For example, in a case where the switching element is an active component, the gate line may be electrically connected to a gate of the active component, the data line may be electrically connected to a source of active component, and a drain of the active component may be electrically connected to the sensing element. Nonetheless, the above-mentioned electrical connection may be changed in accordance with the number and/or kind of the sensing element and/or the switching element, and is not limited thereto.

In some embodiments, the extension portion 104 of the flexible substrate 100 may be bent to a back side of the array portion 102, so that the X-ray device 1 has a narrow bezel design. For example, the extension portion 104 may at least partially overlap the array portion 102 in a normal direction of the supporting plate 130 (e.g., the z direction), and the circuit originally disposed on the periphery of the array portion 102 may instead be disposed in the extension portion 104, which reduces the peripheral space of the array portion 102 and achieves the narrow bezel design. In some embodiments, the extension portion 104 of the flexible substrate 100 may be a portion extending from the boundary 102A of the array portion 102 along an x direction and/or a y direction. In some embodiments, the x direction may be a direction substantially parallel to an extending direction of the gate line in the array portion 102, and the y direction may be a direction substantially parallel to an extending direction of the data line in the array portion 102.

In some embodiments, the material of the flexible substrate 100, for example, may include, but is not limited to, glass, quartz, sapphire, polyimide (PI), polycarbonate (PC), or polyethylene terephthalate (PET), or a combination thereof.

In some embodiments, the driver integrated circuit 112 and/or the driver integrated circuit 114 may be disposed on the extension portion 104 of the flexible substrate 100. With reference to FIG. 2, in an embodiment, the driver integrated circuit 112 may be disposed in the extension portion 104 of the flexible substrate 100 that extends from the boundary 102A of the array portion 102 along the y direction, and the driver integrated circuit 114 may be disposed in the extension portion 104 of the flexible substrate 100 that extends from a side of the array portion 102 along the x direction, where the x direction and the y direction are different directions. Wirings (not shown) electrically connected to the driver integrated circuit 112 and/or the driver integrated circuit 114 and the element modules 140 may be disposed in the extension portion 104. Nonetheless, the disclosure is not limited thereto. In another embodiment, a part of the wirings electrically connected to the driver integrated circuit 112 and/or the driver integrated circuit 114 and the element modules 140 may be partially disposed on the extension portion 104 of the flexible substrate 100, and another part of the wirings may be disposed on the array portion 102 of the flexible substrate 100. Specifically, in the flexible substrate 100, the extension portion 104 may include a circuit extending from the array portion 102 to the extension portion 104, so that components (e.g., the sensing unit) of the array portion 102 can be electrically connected with the components (e.g., the driver integrated circuit 112 and/or the driver integrated circuit 114) of the extension portion 104. In yet another embodiment, the driver integrated circuit 112 may be disposed in the extension portion 104 of the flexible substrate 100 that extends from a side of the array portion 102 along the x direction, and the driver integrated circuit 114 may be disposed in the extension portion 104 of the flexible substrate 100 that extends from a side of the array portion 102 along the y direction.

In accordance with the design requirements of the X-ray device 1, the driver integrated circuit 112 or the driver integrated circuit 114 may be electrically connected to different circuits. In an embodiment, if the driver integrated circuit 112 is electrically connected to the data line, the driver integrated circuit 112 may be a read out integrated circuit (ROIC); if the driver integrated circuit 114 is electrically connected to the gate line, the driver integrated circuit 114 may be a gate driver integrated circuit, but is not limited thereto. In another embodiment, the driver integrated circuit 112 may be electrically connected to the gate line; and the driver integrated circuit 114 may be electrically connected to the data line. The driver integrated circuit 112 and the driver integrated circuit 114 may be same as or different from each other. With reference to FIG. 1 and FIG. 2, notably, two different observation directions may be shown in FIG. 1, and according to the different observation directions, the driver integrated circuit may represent different driver integrated circuits. That is to say, if observed from an observation direction A in FIG. 2, the driver integrated circuit in FIG. 1 is the driver integrated circuit 112; if observed from the observation direction B in FIG. 2, the driver integrated circuit in FIG. 1 is the driver integrated circuit 114.

In some embodiments, the extension portion 104 of the flexible substrate 100 include a plurality of gaps 106 near the boundary (e.g. the boundary 102A) of the array portion 102. In this way, when the extension portion 104 is bent to the back side of the array portion 102, stress generated at the bending portion of the flexible substrate 100 are reduced, thereby improving the quality or the yield rate of the process. Nonetheless, the disclosure is not limited thereto. In other embodiments, the extension portion 104 of the flexible substrate 100 may as well not include the plurality of gaps 106 near the boundary of the array portion 102. In some embodiments, the driver integrated circuit 112 and/or the driver integrated circuit 114 may be disposed between two adjacent gaps 106, but the disclosure is not limited thereto. Notably, the plurality of gaps 106 shown in FIG. 2 are merely an example of the disclosure, and the disclosure is not limited thereto. In some embodiments, the shape, the number, the density, or the arrangement of the plurality of gaps 106 may not be limited.

In some embodiments, the scintillator layer 120 may be disposed corresponding to a sensing area in the array portion 102. For example, the scintillator layer 120 may at least partially overlap the sensing area in the array portion 102 in the normal direction (e.g., the z direction) of the supporting plate 130. In some embodiments, the material of the scintillator layer 120 may include but is not limited to CsI. In other embodiments, the material of the scintillator layer 120 may include other kinds of inorganic scintillators or organic scintillators adapted to convert the X-rays incident into the X-ray device 1 into visible light. In some embodiments, the scintillator layer 120 may be formed on the flexible substrate 100 through a deposition process. The deposition process may include but is not limited to an evaporation process.

The supporting plate 130 may be disposed on the array portion 102 of the flexible substrate 100; in other words, the supporting plate 130 and the array portion 102 are correspondingly disposed. Specifically, in the normal direction of the supporting plate 130, the supporting plate 130 at least partially overlap the array portion 102, and the supporting plate 130 and the scintillator layer 120 are disposed on different sides of the flexible substrate 100. In this way, when other film layers are formed on the array portion 102 of the flexible substrate 100, these other film layers are not susceptible to deformation due to external forces during manufacturing, so that the film layers (e.g. the scintillator layer 120) formed on the flexible substrate 100 well exhibits flatness or stability, which helps to improve the yield rate. In some embodiments, the supporting plate 130 may be a hard supporting plate. For example, the material of the supporting plate 130 may include but is not limited to glass, ceramic, or stainless steel. In some embodiment, with reference to FIG. 2, in the top view direction, the array portion 102 may be defined as the portion overlapped with the supporting plate 130. For example, the boundary 102A may be the line at the junction between the array portion 102 and the extension portion 104, and may also be the boundary of the supporting plate 130. Those portions not overlapped with the supporting plate 130 may be defined as the extension portion 104.

In some embodiments, the X-ray device 1 may also include the element modules 140. The arrangement and/or the number of the element modules 140 may be changed depending on requirements. In some embodiments, the element modules 140 may include a passive component, such as a capacitor, a resistor, or an inductor. The element modules 140 may be disposed on the extension portion 104 of the flexible substrate 100. In some embodiments, the element modules 140 may be mounted on the extension portion 104 of the flexible substrate 100 through surface mounting technology (SMT). In this way, a circuit board including the element modules may be omitted, which helps to improve the yield rate, reduce the cost, or achieve light weight. Nonetheless, the disclosure is not limited thereto.

In some embodiments, the X-ray device 1 may also include a housing 12. The housing 12 may surround the flexible substrate 100. Specifically, with reference to FIG. 1, the housing 12 may include a light entering portion 12A and a carrying portion 12B. The light entering portion 12A is disposed on a light entering side of the X-ray device 1. The X-rays (e.g., arrows X shown in FIG. 1) enter the X-ray device 1 through the light entering portion 12A. The material of the light entering portion 12A, for example, may include but is not limited to carbon fibers. The carrying portion 12B is connected to the light entering portion 12A, and the carrying portion 12B and the light entering portion 12A define a space S that accommodates at least the sensing structure 10. That is to say, the space S accommodates at least the flexible substrate 100, the driver integrated circuit 112, the driver integrated circuit 114, and the scintillator layer 120. The material of the carrying portion 12B may be any material suitable for carrying the sensing structure 10, and is not limited herein.

Hereinafter, FIG. 2 serves as an example for illustrating a method for manufacturing the sensing structure, but the disclosure is not limited thereto.

In some embodiments, the sensing structure 10 may be manufactured through the following steps. First, the flexible substrate 100 including the array portion 102 and the extension portion 104 is provided. The flexible substrate 100 may include the scintillator layer 120 formed in the array portion 102. Next, the driver integrated circuit 112 and/or the driver integrated circuit 114 are formed on the extension portion 104 and/or the array portion 102 of the flexible substrate 100. After that, the element modules 140 are formed in the extension portion 104 of the flexible substrate 100. In some embodiments, the driver integrated circuit 112 and/or the driver integrated circuit 114 may be formed on the flexible substrate 100 through a bonding process. In some embodiments, the element modules 140 may be mounted on the extension portion 104 of the flexible substrate 100 through surface mounting technology.

Figure 3:
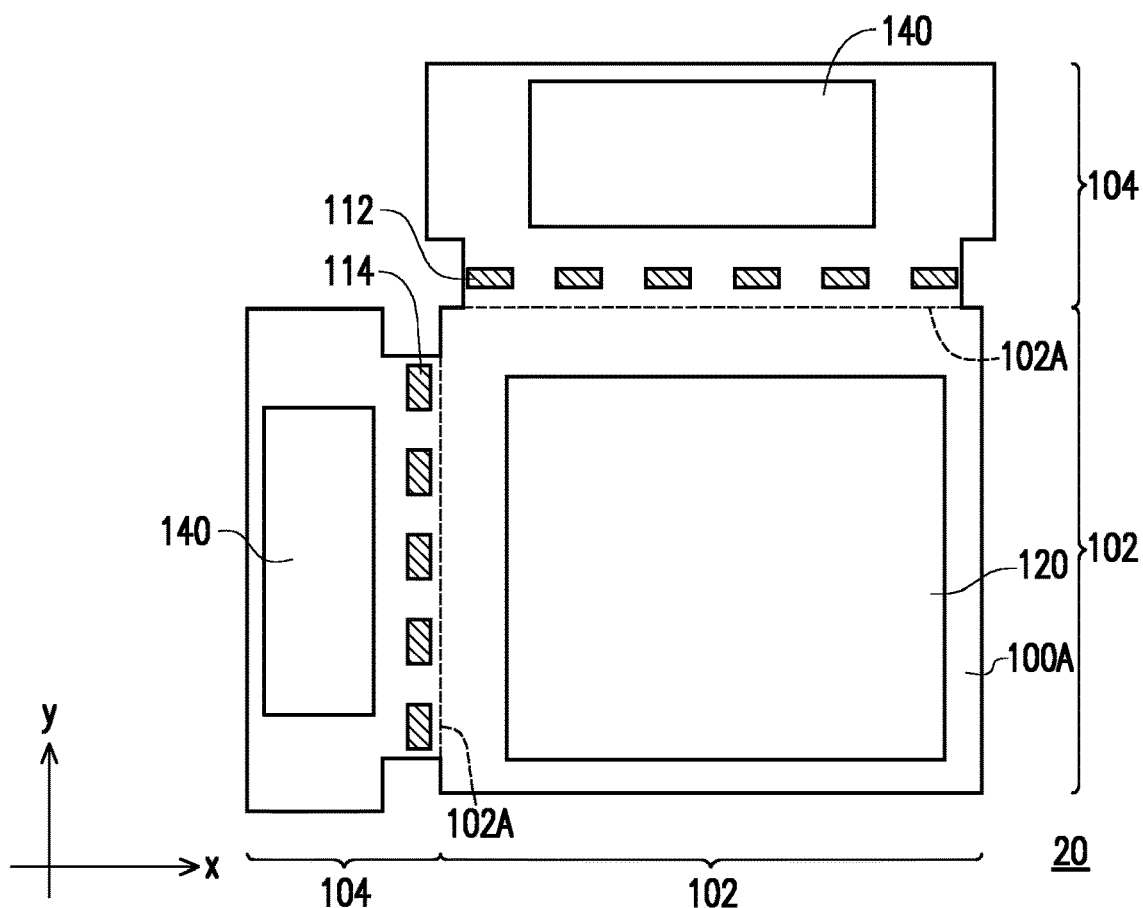
FIG. 3 is a schematic top view of a sensing structure in a flattened state according to another embodiment of the disclosure.
Figure 4:
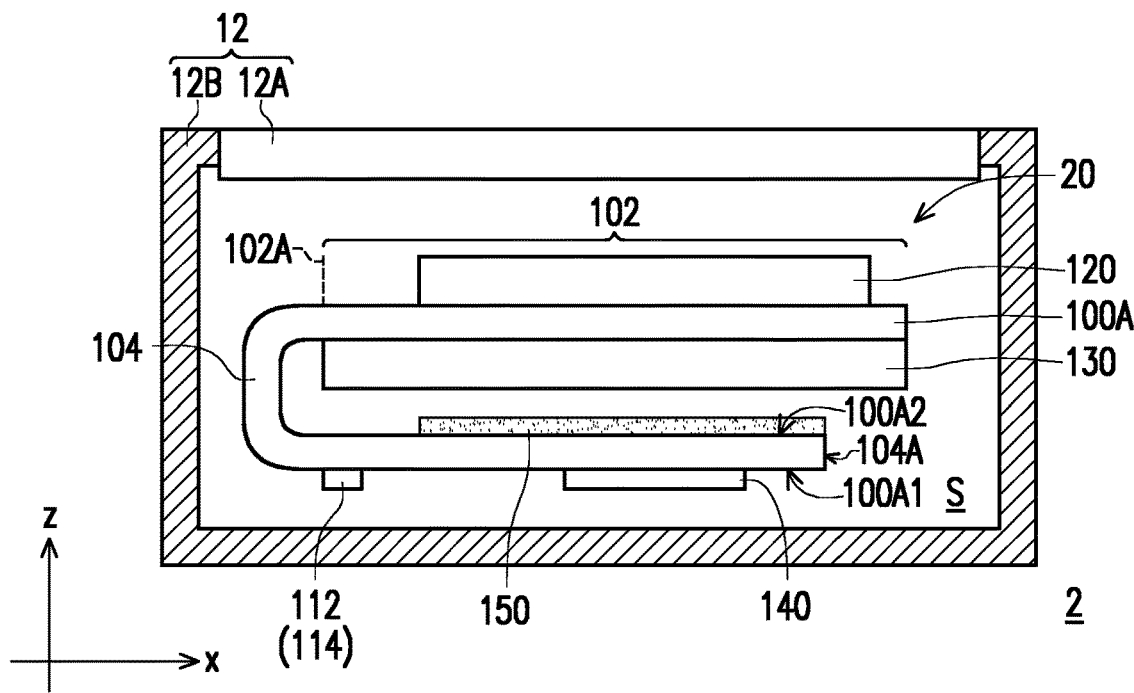
FIG. 4 is a schematic cross-sectional view of the sensing structure in the X-ray device in FIG. 3.

FIG. 3 is a schematic top view of a sensing structure in a flattened state according to another embodiment of the disclosure. FIG. 4 is a schematic cross-sectional view of the sensing structure in the X-ray device in FIG. 3. A sensing structure 20 in FIG. 3 and FIG. 4 is substantially the same as the sensing structure 10 in FIG. 1 and FIG. 2. The difference lies in that the extension portion 104 of a flexible substrate 100A does not include the plurality of gaps 106 near the boundary of the array portion 102 (e.g., the boundary 102A), and that the sensing structure 20 also includes a carrier 150. Identical or similar reference numerals are employed for the remaining identical or similar components, and the connection relationships, the materials, and the manufacturing process of the remaining components have been described in detail in the foregoing, and thus will not be repeatedly described hereinafter. Notably, although the extension portion 104 of the flexible substrate 100A shown in FIG. 3 does not include the plurality of gaps 106 near the boundary of the array portion 102, this is merely one of the embodiments of the disclosure. In another embodiment, the extension portion 104 of the flexible substrate 100A may include the plurality of gaps 106 near the boundary of the array portion 102.

With reference to FIG. 3 and FIG. 4, the sensing structure 20 in an X-ray device 2 may also include the carrier 150. In some embodiments, the carrier 150 may be disposed on the extension portion 104, and the carrier 150 and the driver integrated circuit 112 and/or the driver integrated circuit 114 may be disposed on different sides of the flexible substrate 100A. For example, the driver integrated circuit 112 and/or the driver integrated circuit 114 may be disposed on a surface 100A1 of the flexible substrate 100A, and the carrier 150 may be disposed on a surface 100A2 of the flexible substrate 100A, where the surface 100A1 and the surface 100A2 are different surfaces, and the surface 100A1 and the surface 100A2 are disposed correspondingly. In another embodiment, the carrier 150 may be a part of component that remains during the manufacturing process in which the X-ray device 2 is formed. That is to say, during the manufacturing process of the X-ray device 2, the flexible substrate 100A may first be disposed on the carrier 150, and then components such as the scintillator layer 120, the driver integrated circuit 112, or the driver integrated circuit 114 are disposed on the flexible substrate 100A. After that, laser lift-off, for example, may be adopted to partially peel the carrier 150 from the flexible substrate 100A, and the carrier 150 disposed on the extension portion 104 remains. Thereby, other layers formed or other components (e.g. the element module 140, the driver integrated circuit 112, or the driver integrated circuit 114) disposed on the extension portion 104 of the flexible substrate 100A are not susceptible to deformation due to external forces, so that the extension portion 104 well exhibits flatness or stability is increased for other film layers formed or other components (e.g. the element module 140, the driver integrated circuit 112, or the driver integrated circuit 114) disposed on the extension portion 104, which helps to improve yield rate. In some embodiments, the carrier 150 may be a hard/rigid carrier. For example, the material of the carrier 150 may include but is not limited to glass, ceramic, or stainless steel. In some embodiments, with reference to FIG. 4, the boundary (e.g., a boundary 104A) of the extension portion 104 of the flexible substrate 100A may be substantially aligned with the boundary of the carrier 150, but the disclosure is not limited to this. In another embodiment, the boundary of the carrier 150 may protrude from the boundary 104A of the extension portion 104.

Figure 5:
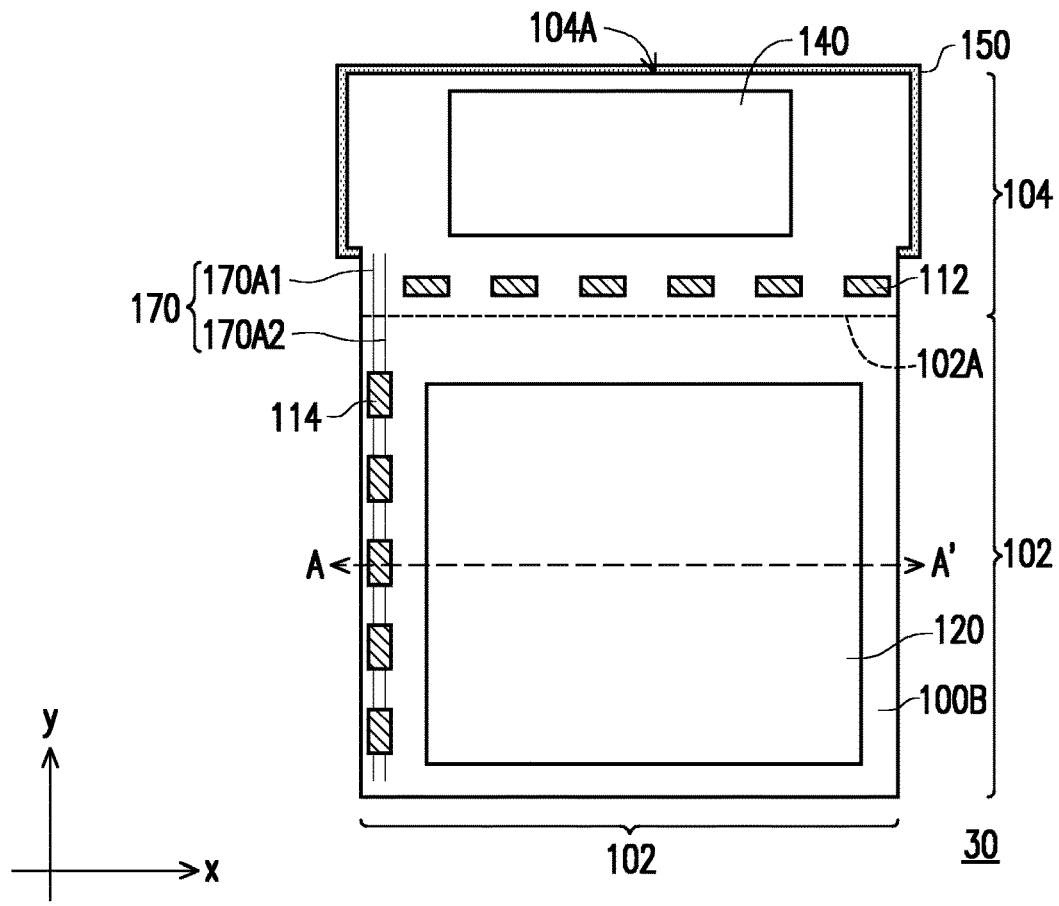
FIG. 5 is a schematic top view of a sensing structure in a flattened state according to yet another embodiment of the disclosure.
Figure 6:
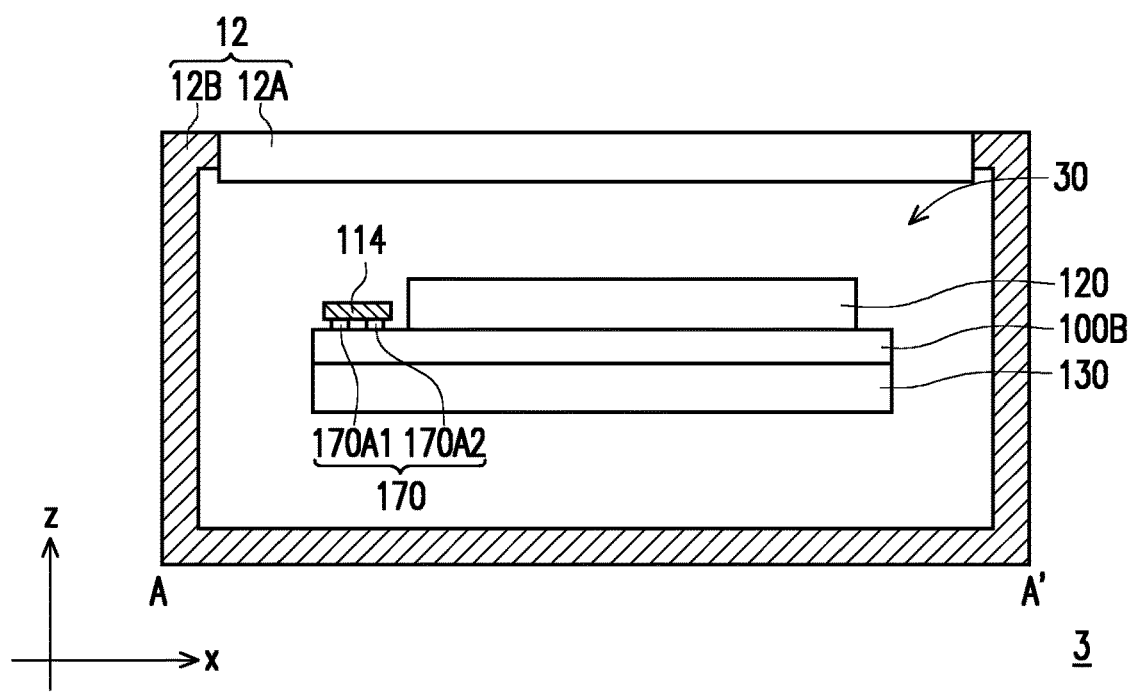
FIG. 6 is a schematic cross-sectional view of the sensing structure in the X-ray device taken along line A-A' in FIG. 5.

FIG. 5 is a schematic top view of another embodiment sensing structure in a flattened state according to the disclosure. FIG. 6 is a schematic cross-sectional view of the sensing structure in the X-ray device taken along line A-A' in FIG. 5. A sensing structure 30 in FIG. 5 and FIG. 6 is substantially the same as the sensing structure 20 in FIG. 3 and FIG. 4. The difference lies in that the extension portion 104 of a flexible substrate 100B extends from the boundary 102A of the array portion 102 along the y direction, and that the flexible substrate 100B may or may not include the extension portion 104 that extends from a side of the array portion 102 along the x direction. That is to say, the side of the array portion 102 may extend along the x direction, or may not extend along the x direction, depending on design conditions. The sensing structure 30 in FIG. 5 further includes a circuit structure 170, and the circuit structure 170 may include a plurality of wirings. Identical or similar reference numerals are employed for the remaining identical or similar components, and the connection relationships, the materials, and the manufacturing process of the remaining components have been described in detail in the foregoing, and thus will not be repeatedly described hereinafter. It should be appreciated that for better understanding, some elements are omitted and/or simplified in FIG. 5, but the disclosure is not limited thereto. That is to say, although FIG. 5 depicts merely two wirings, the disclosure is not limited thereto. The circuit structure 170 may also include, for example, the wiring that extends in the x direction. Analogously, in FIG. 6, another layer may also be included between the flexible substrate 100B and the scintillator layer 120, and another layer may also be included between the driver integrated circuit 114 and the wiring, or between the wiring and the flexible substrate 100B. For example, a solid optical clear adhesive (OCA) or an anisotropic conductive film (ACF) may be included between the driver integrated circuit 114 and the wiring. The disclosure is not limited thereto. An insulating layer or a functional layer may be included between the wiring and the flexible substrate 100B, and the functional layer may be a planarization layer. The disclosure is not limited thereto. Notably, the boundary of the carrier 150 protruding from the boundary 104A of the extension portion 104 in FIG. 5 is merely an example, and the disclosure is not limited thereto. In another embodiment, the boundary 104A of the extension portion 104 of the flexible substrate 100B may be substantially aligned with the boundary of the carrier 150. With reference to FIG. 5 and FIG. 6, in some embodiments of the disclosure, a wiring (not shown) electrically connected to the driver integrated circuit 112 and the element module 140 may be provided in the extension portion 104, and wirings 170A1 and 170A2 electrically connected to the driver integrated circuit 114 and the element module 140 may be disposed on the array portion 102. To be specific, the wiring electrically connected to the driver integrated circuit 114 and the element module 140 adopts a wire-on array (WOA) to be connected in series to the element module 140, which contributes to the narrow bezel design. In an embodiment, the wiring 170A1 and 170A2 may be disposed between, for example, the driver integrated circuit 114 and the flexible substrate 100B. In some embodiments, the driving circuit 112 may be disposed on a back of the supporting plate 130 as the extension portion 104 is bent to the back of the supporting plate 130. This structure is similar to the schematic cross-sectional diagram of FIG. 4, to which reference may made at the same time. Therefore, the driver integrated circuit 112 and the driver integrated circuit 114 may be located at different levels in an X-ray device 3. In some embodiments, the sensing structure 30 may selectively include the carrier 150. In some embodiment, the driver integrated circuit 114 may be a gate driver integrated circuit and be disposed on the array portion 102; namely, the driver integrated circuit 114 is electrically connected to a gate line (not shown) on the array portion 102.

Figure 7:
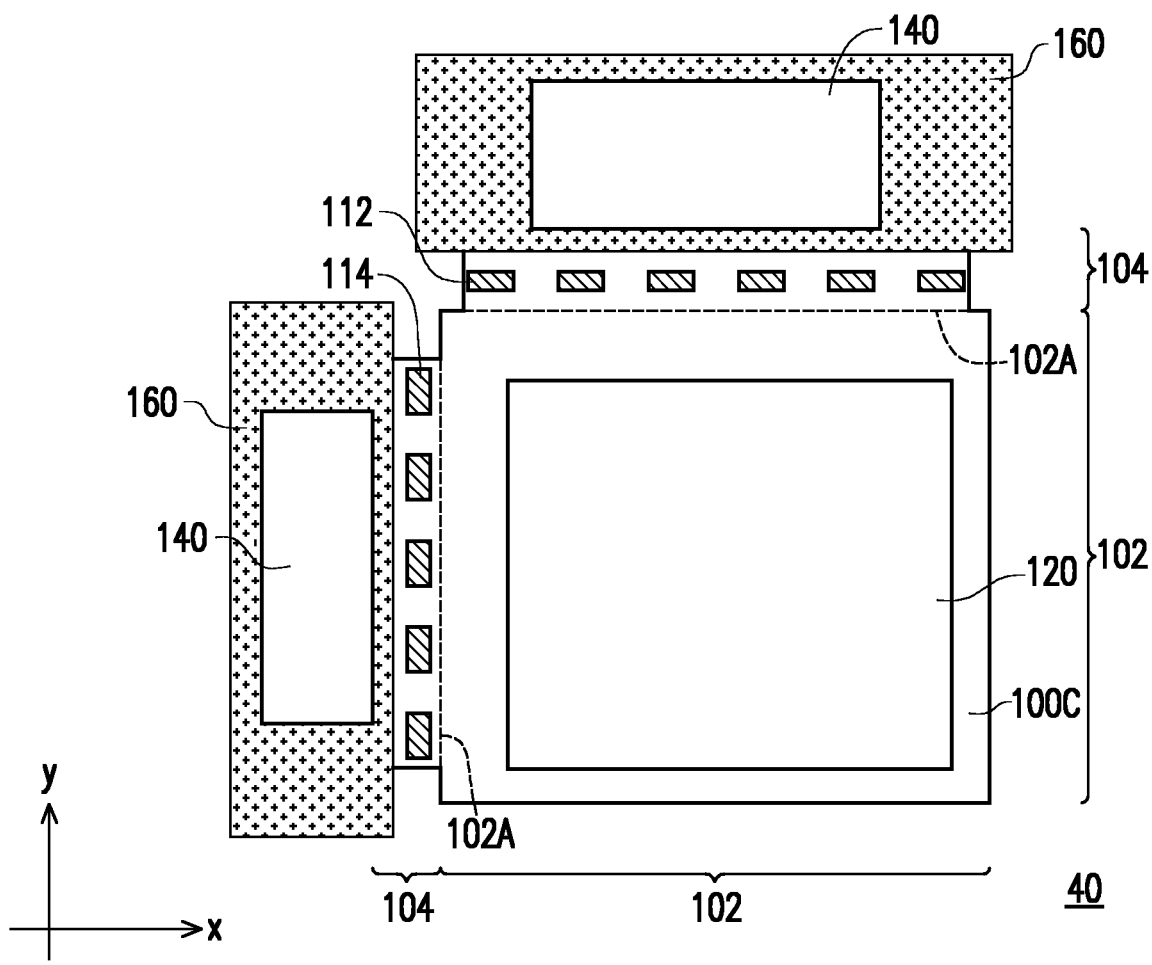
FIG. 7 is a schematic top view of a sensing structure in a flattened state according to still another embodiment of the disclosure.

FIG. 7 is a schematic top view of a sensing structure in a flattened state according to still another embodiment of the disclosure. A sensing structure 40 in FIG. 7 is substantially the same as the sensing structure 10 in FIG. 2. The difference lies in that the sensing structure 40 also includes a circuit board 160. Identical or similar reference numerals are employed for the remaining identical or similar components, and the connection relationships, the materials, and the manufacturing process of the remaining components have been described in detail in the foregoing, and thus will not be repeatedly described hereinafter.

With reference to FIG. 7, the sensing structure 40 also includes the circuit board 160. In some embodiments, the circuit board 160 may be provided on the extension portion 104. The circuit board 160 may include the element modules 140, and the element modules 140 are disposed on the circuit board 160. The driver integrated circuit 112 and/or the driver integrated circuit 114 may be electrically connected to the element modules 140 through circuits in the circuit board 160. In another embodiment, the circuit board 160 partially overlaps the extension portion 104 in the normal direction of the support portion 130. Besides, the extension portion 104 of a flexible substrate 100C may selectively include a plurality of gaps near the boundary 102A of the array portion 102, such as the plurality of gaps 106 in FIG. 2. In some embodiments, the extension portion 104 of the flexible substrate 100C may extend from a side of the array portion 102 (e.g., the boundary 102A) along the y direction. In this way, the driver integrated circuit 112 may be electrically connected to the element modules 140 through the circuit in the circuit board 160.

In another embodiment, a wiring (not shown) electrically connected to the driving circuit 114 and the element module 140 may be disposed in the array portion 102. That is to say, possibly with reference to the structure of FIG. 5 (e.g., the extension portion 104 that extends in the x direction is not disposed), the wiring electrically connected to the drive circuit 114 and the element module 140 may adopts the wire-on array to be connected in series to the element module 140, to reduce the space occupied by the extension portion 104 that extends along the x direction and the circuit board 160 partially overlapped with the extension portion 104, which contributes to the narrow bezel design. In some embodiment, the driver integrated circuit 114 may be a gate driver integrated circuit and be disposed on the array portion 102, and the flexible substrate 100C may or may not include the extension portion 104 that extends in the x direction from a side of the array portion 102. That is to say, the extension portion 104 may extend from the side of the array portion 102 along the x direction, and may as well not extend from the side of the array portion 102 along the x direction, depending on design conditions.

In summary of the foregoing, in the embodiments of the disclosure, the driver integrated circuit and the scintillator layer are disposed on the flexible substrate. That is to say, the flexible substrate may integrate components such as the sensing panel, the flexible board, and the circuit boards. Therefore, the complicated bonding process can be simplified, which helps to improve the yield rate, reduce the cost, or achieve light weight. In some embodiments, the extension portion of the flexible substrate may include the plurality of gaps near the boundary of the array portion, which reduces the stress generated at the bending portion of the flexible substrate, to improve the quality of the process. In some embodiment, the driver integrated circuit may be disposed on the array portion, and the driver integrated circuit may be connected in series to the element module in the array portion through the wire-on array, which contributes to the narrow bezel design. In some embodiments, the sensing structure may also include the supporting plate disposed on the array portion of the flexible substrate. When other layers are formed on the array portion of the flexible substrate, these other layers are not susceptible to deformation due to external forces during the manufacturing process, so that the layer formed on the flexible substrate well exhibits flatness or stability, which helps to improve the yield rate. In some embodiments, the sensing structure may also include the carrier disposed on the extension portion. In this way, when other film layers are formed or other components are disposed on the extension portion of the flexible substrate, these other film layers or other components are not susceptible to deformation due to external forces during the manufacturing process or the disposal process, so that these other film layers or other components formed on the flexible substrate well exhibits flatness or stability, which helps to improve the yield rate.

The foregoing embodiments are only used to illustrate, instead of limiting, the technical solutions of the disclosure. Although the disclosure has been described in detail with reference to the foregoing embodiments, people having ordinary skill in the art should understand that the technical solutions described in the foregoing embodiments may still be modified, or that some or all technical features therein may be equivalently replaced. However, the nature of the corresponding technical solutions so modified or replaced does not depart from the scope of the technical solutions of the embodiments of the disclosure. The features of the embodiments may be arbitrarily mixed and combined as long as they do not depart from or conflict with the spirit of the disclosure.

Although the embodiments and the advantages thereof have been disclosed as above, it should be understood that, people having ordinary skill in the art may make variations, replacements, and modifications without departing from the spirit and scope of the disclosure, and the features of each embodiment may be arbitrarily mixed and replaced into other new embodiments. In addition, the protection scope of the disclosure is not limited to a process, machine, manufacturing, material composition, device, method, and step in a specific embodiment in this specification. People having ordinary skill in the art may understand that the existing or to-be-developed process, machine, manufacturing, material composition, device, method, and step from the content of the disclosure may be used according to the disclosure as long as the substantially same function can be implemented or the substantially same result can be obtained in the embodiments described herein. Therefore, the protection scope of the disclosure includes the foregoing process, machine, manufacturing, material composition, device, method, and step. In addition, each claim forms an independent embodiment, and the protection scope of the disclosure also includes a combination of claims and embodiments. The protection scope of the disclosure should be subject to the appended claims.

What is claimed is:

1. An X-ray device, comprising:
a flexible substrate comprising an array portion and an extension portion, wherein the array portion and the extension portion are connected to each other to form a continuous layer;
a plurality of driver integrated circuits individually mounted on the flexible substrate; and
a scintillator layer disposed on the flexible substrate,
wherein the extension portion comprises a plurality of openings near a boundary of the array portion and arranged along the boundary of the array portion.

2. The X-ray device according to claim 1, further comprising:
a carrier disposed on the extension portion, wherein the carrier and the plurality of driver integrated circuits are disposed on different sides of the flexible substrate.

3. The X-ray device according to claim 1, further comprising:
a supporting plate disposed on the array portion, wherein the supporting plate and the scintillator layer are disposed on different sides of the flexible substrate.

4. The X-ray device according to claim 3, wherein the supporting plate at least partially overlap the scintillator layer in a top view direction.

5. The X-ray device according to claim 3, wherein the extension portion is bent to have a part that is disposed on a different side of the supporting plate from the array portion.

6. The X-ray device according to claim 5, wherein the plurality of driver integrated circuits comprise a first driver integrated circuit disposed on the part of the extension portion and a second driver integrated circuit disposed on the array portion.

7. The X-ray device according to claim 1, further comprising:
a plurality of element modules disposed on the extension portion.

8. The X-ray device according to claim 7, wherein the plurality of driver integrated circuits comprise a first driver integrated circuit disposed on the extension portion and a second driver integrated circuit disposed on the array portion, and wirings electrically connected to the second driver integrated circuit and the plurality of element modules are disposed on the array portion.

9. The X-ray device according to claim 1, wherein the flexible substrate comprises polyimide.

10. The X-ray device according to claim 1, wherein the plurality of openings comprises long sides parallel to a direction along which the extension portion extends from the array portion.

11. The X-ray device according to claim 1, wherein the plurality of driver integrated circuits are disposed between two adjacent openings.

12. The X-ray device according to claim 1, further comprising:
a housing surrounding the flexible substrate.

13. The X-ray device according to claim 12, wherein the housing comprises a light entering portion and a carrying portion, the light entering portion is disposed on a light entering side of the X-ray device, and the carrying portion surrounds the flexible substrate and is connected to the light entering portion.

14. The X-ray device according to claim 1, wherein the plurality of driver integrated circuits are gate driver integrated circuits.

15. The X-ray device according to claim 14, further comprising:
a circuit structure, wherein the circuit structure comprises a plurality of wirings, and the plurality of wirings are disposed between the gate driver integrated circuits and the flexible substrate.

16. The X-ray device according to claim 15, wherein the plurality of wirings comprise a first wiring disposed on the extension portion and a second wiring extending from the array portion toward the extension portion.

17. The X-ray device according to claim 1, wherein the plurality of driver integrated circuits comprise a first driver integrated circuit disposed on the extension portion and a second driver integrated circuit disposed on the array portion.

18. The X-ray device according to claim 1, further comprising:
a circuit board disposed on the extension portion, wherein the circuit board and the plurality of driver integrated circuits are disposed on the same side of the flexible substrate.

19. The X-ray device according to claim 18, wherein the circuit board comprises a plurality of element modules disposed on the circuit board, and the plurality of driver integrated circuits are electrically connected to the plurality of element modules through wirings in the circuit board.

* * * * *